(12) United States Patent
Yamashita

(10) Patent No.: US 10,770,764 B2
(45) Date of Patent: Sep. 8, 2020

(54) BATTERY PACK

(71) Applicant: TOYOTA JIDOSHA KABUSHIKI KAISHA, Toyota-shi, Aichi-ken (JP)

(72) Inventor: Aki Yamashita, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 9 days.

(21) Appl. No.: 16/142,086

(22) Filed: Sep. 26, 2018

(65) Prior Publication Data
US 2019/0109354 A1 Apr. 11, 2019

(30) Foreign Application Priority Data

Oct. 5, 2017 (JP) ................................. 2017-195333

(51) Int. Cl.
| | |
|---|---|
| *H01M 10/6551* | (2014.01) |
| *H01M 10/613* | (2014.01) |
| *H01M 10/625* | (2014.01) |
| *H01M 10/6556* | (2014.01) |
| *H01M 2/10* | (2006.01) |
| *H01M 10/647* | (2014.01) |
| *H01M 10/617* | (2014.01) |
| *H01M 10/653* | (2014.01) |
| *C09J 11/04* | (2006.01) |

(52) U.S. Cl.
CPC ..... *H01M 10/6551* (2015.04); *H01M 2/1077* (2013.01); *H01M 10/613* (2015.04); *H01M 10/625* (2015.04); *H01M 10/647* (2015.04); *H01M 10/6556* (2015.04); *H01M 2220/20* (2013.01)

(58) Field of Classification Search
None
See application file for complete search history.

(56) References Cited

U.S. PATENT DOCUMENTS 10,116,018 B2 * 10/2018 Phlegm ............ H01M 10/6557
2016/0093932 A1 * 3/2016 Obasih .............. H01M 10/6562
429/120

FOREIGN PATENT DOCUMENTS

| JP | 2009-224556 A | 10/2009 | |
|---|---|---|---|
| JP | 2014-229559 A | 12/2014 | |
| WO | WO-2012013789 A1 * | 2/2012 | .......... H01M 10/625 |

OTHER PUBLICATIONS

Takenaka, Koshi. "Negative thermal expansion materials: technological key for control of thermal expansion." Science and technology of advanced materials vol. 13,1013001. Feb. 2, 2012, doi:10.1088/1468-6996/13/1/013001 (Year: 2012).*

(Continued)

*Primary Examiner* — Ula C Ruddock
*Assistant Examiner* — Amanda Rosenbaum
(74) *Attorney, Agent, or Firm* — Sughrue Mion, PLLC

(57) ABSTRACT

A battery pack includes a plurality of batteries that include heat dissipation surfaces, a cooler that cools each of the plurality of the batteries through each of the heat dissipation surfaces, and a viscous layer that is interposed between each of the heat dissipation surfaces and the cooler. The viscous layer contains a filler having a negative thermal expansion coefficient.

8 Claims, 3 Drawing Sheets

(56) References Cited

OTHER PUBLICATIONS

Nan Zhong et al 2016 Smart Mater. Struct. 25 084016 (Year: 2016).*

Zhong, Nan, et al. "The Effect of Filler Parameters on the Healing of Thermal Conductivity and Mechanical Properties of a Thermal Interface Material Based on a Self-Healable Organic-Inorganic Polymer Matrix." Smart Materials and Structures, vol. 25, No. 8, 2016, p. 084016. (Year: 2016).*

* cited by examiner

BATTERY PACK

INCORPORATION BY REFERENCE

The disclosure of Japanese Patent Application No. 2017-195333 filed on Oct. 5, 2017 including the specification, drawings and abstract is incorporated herein by reference in its entirety.

BACKGROUND

1. Technical Field

The disclosure relates to a battery pack that is equipped with a plurality of batteries that are aligned with one another and a cooler that cools each of these batteries.

2. Description of Related Art

For example, as a battery pack that is mounted in a vehicle such as a hybrid vehicle, a plug-in hybrid vehicle, an electric vehicle or the like, there is known a battery pack that is equipped with a plurality of batteries that are laminated on one another, a cooler that causes a cooling medium to flow through an interior thereof to cool these batteries, and a heat conduction member that is arranged between the plurality of the batteries and the cooler. Such a battery pack is disclosed in, for example, Japanese Patent Application Publication No. 2014-229559 (JP 2014-229559 A) (see claim 1, FIG. 1 and the like of Japanese Patent Application Publication No. 2014-229559 (JP 2014-229559 A)).

SUMMARY

In the above-mentioned Japanese Patent Application Publication No. 2014-229559 (JP 2014-229559 A)), the heat conduction member configured as a metal member is used as the heat conduction member that is interposed between each of the batteries and the cooler. In this case, with a view to enhancing the efficiency of heat conduction from each of the batteries to the cooler, it is conceivable to fill a space between each of the batteries and the cooler with a heat dissipation grease and form a viscous layer made of the heat dissipation grease between each of the batteries and the cooler. However, the amounts of heat generated by the plurality of the batteries included in the battery pack are different from one another, so the temperature of the viscous layer differs depending on the spot. That is, the temperature of those regions of the viscous layer which are in contact with the batteries that generate a large amount of heat is high, whereas the temperature of those regions of the viscous layer which are in contact with the batteries that generate a small amount of heat is low.

The viscous layer expands when the temperature thereof becomes high. When the viscous layer thermally expands and increases in thickness, an amount of heat transfer $Q$ (W) between a heat dissipation surface of each of the batteries and the cooler falls, so the batteries become unlikely to be cooled. That is, as the amount of heat generated by each of the batteries increases, the fall in the amount of heat transfer $Q$ (W) through the viscous layer that is in contact with this battery increases, and the likelihood of the battery being cooled decreases. As described hitherto, the batteries that generate a small amount of heat are cooled well, whereas the batteries that generate a large amount of heat are unlikely to be cooled. Therefore, the battery temperature widely varies among the batteries included in the battery pack.

Besides, even in a battery pack where each of batteries and a cooler are fixed to each other such that the thickness of a viscous layer (the clearance between a heat dissipation surface of each of the batteries and the cooler) does not change, when the temperature of the viscous layer becomes high, the viscous layer thermally expands, spreads in a direction perpendicular to a thickness direction thereof, and decreases in density. In this case as well, the amount of heat transfer $Q$ (W) between the heat dissipation surface of each of the batteries and the cooler falls, so the batteries become unlikely to be cooled. Therefore, the batteries that generate a small amount of heat are cooled well, whereas the batteries that generate a large amount of heat are unlikely to be cooled. Therefore, even in the battery pack that is configured such that the thickness of the viscous layer does not change, the battery temperature widely varies among the batteries included in the battery pack.

The disclosure provides a battery pack capable of restraining the battery temperature from varying among batteries included in a battery pack.

A battery pack according one aspect of the disclosure includes a plurality of batteries that include heat dissipation surfaces and that are aligned with one another, a cooler that cools each of the plurality of the batteries through each of the heat dissipation surfaces, and a viscous layer that is interposed between each of the heat dissipation surfaces and the cooler. The viscous layer contains a filler having a negative thermal expansion coefficient.

In the above-mentioned battery pack, the viscous layer that is interposed between the heat dissipation surface of each of the batteries and the cooler contains the filler having the negative thermal expansion coefficient (hereinafter referred to also as "a negative coefficient filler"). As described previously, the viscous layer that does not contain this negative coefficient filler thermally expands when the temperature thereof becomes high. In contrast, the viscous layer that contains the negative coefficient filler shrinks when the temperature thereof becomes high, as far as the negative coefficient filler is concerned. Therefore, the viscous layer that contains the negative coefficient filler is more effectively restrained from thermally expanding than the viscous layer that does not contain the negative coefficient filler.

Therefore, the amount of heat transfer $Q$ (W) between the heat dissipation surface of each of the batteries and the cooler in the viscous layer that contains the negative coefficient filler is more effectively restrained from falling than the amount of heat transfer $Q$ (W) between the heat dissipation surface of each of the batteries and the cooler in the viscous layer that does not contain the negative coefficient filler, even when the temperature thereof becomes high. Therefore, even the batteries that generate a large amount of heat are likely to be cooled. Accordingly, the battery temperature can be more effectively restrained from varying among the batteries included in the battery pack, in the battery pack that is equipped with the viscous layer containing the negative coefficient filler than in the battery pack that is equipped with the viscous layer containing no negative coefficient filler.

A glass filler having the negative thermal expansion coefficient $\alpha$, a zirconium phosphate filler having the negative thermal expansion coefficient $\alpha$, or the like can be mentioned as an example of "the negative coefficient filler".

In the foregoing aspect of the disclosure, the batteries may be aligned with one another.

In the foregoing aspect of the disclosure, the thermal expansion coefficient $\alpha$ of the filler may be equal to or smaller than $-0.5\times10^{-6}/K^{-1}$, K may represent kelvin, and a ratio of a mass of the filler to a mass of all constituents in the viscous layer other than the filler may be equal to or larger than 0.4 wt %.

As described hitherto, the viscous layer can be more effectively restrained from thermally expanding, by using the greatly shrinking negative coefficient filler having the thermal expansion coefficient equal to or smaller than $-0.5\times10^{-6}\ K^{-1}$, and setting the ratio of the negative coefficient filler to the viscous layer large, that is, equal to or larger than 0.4 wt %. Thus, the battery temperature can be more effectively restrained from varying among the batteries included in the battery pack.

In the foregoing aspect of the disclosure, the ratio of a mass of the filler to a mass of all constituents in the viscous layer other than the filler may be equal to or smaller than 1.25 wt %.

When the viscous layer contains a large amount of the negative coefficient filler, more specifically, when the ratio of the negative coefficient filler to the viscous layer is larger than 1.25 wt %, the viscosity of the viscous layer is too high. As a result, it is difficult to form the viscous layer with a uniform thickness while ensuring that no void or the like is contained therein, so the transfer of heat through the viscous layer is likely to be inhomogeneous. Therefore, the battery temperature is likely to widely vary among the batteries included in the battery pack. In contrast, in the above-mentioned battery pack, the ratio of the negative coefficient filler to the viscous layer is equal to or smaller than 1.25 wt %. Therefore, the viscous layer can be formed with a uniform thickness while containing no void or the like, and hence can be formed such that heat is homogeneously transferred therethrough. Therefore, the battery temperature can be prevented from widely varying among the batteries included in the battery pack.

In the foregoing aspect of the disclosure, the filler may be a spherical glass filler having a negative thermal expansion coefficient.

The spherical glass filler having the negative thermal expansion coefficient is easily available and easy to handle. It is therefore preferable to use the spherical glass filler having the negative thermal expansion coefficient, as the negative coefficient filler.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

Figure 1:
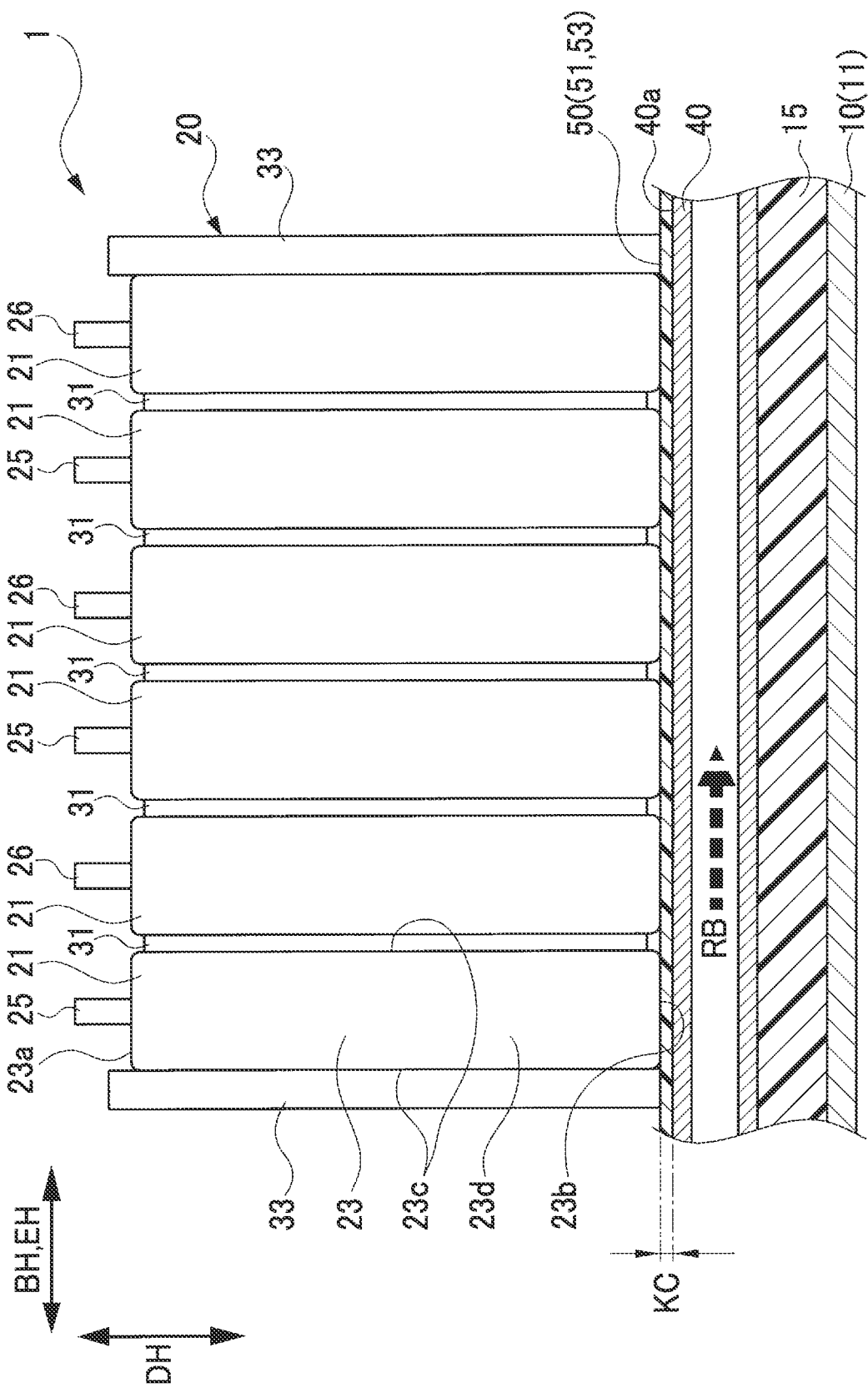
FIG. 1 is a partially broken cross-sectional view of a battery pack according to the embodiment of the disclosure along an alignment direction thereof and a longitudinal direction thereof (which is perpendicular to a lateral direction thereof)
Figure 2:
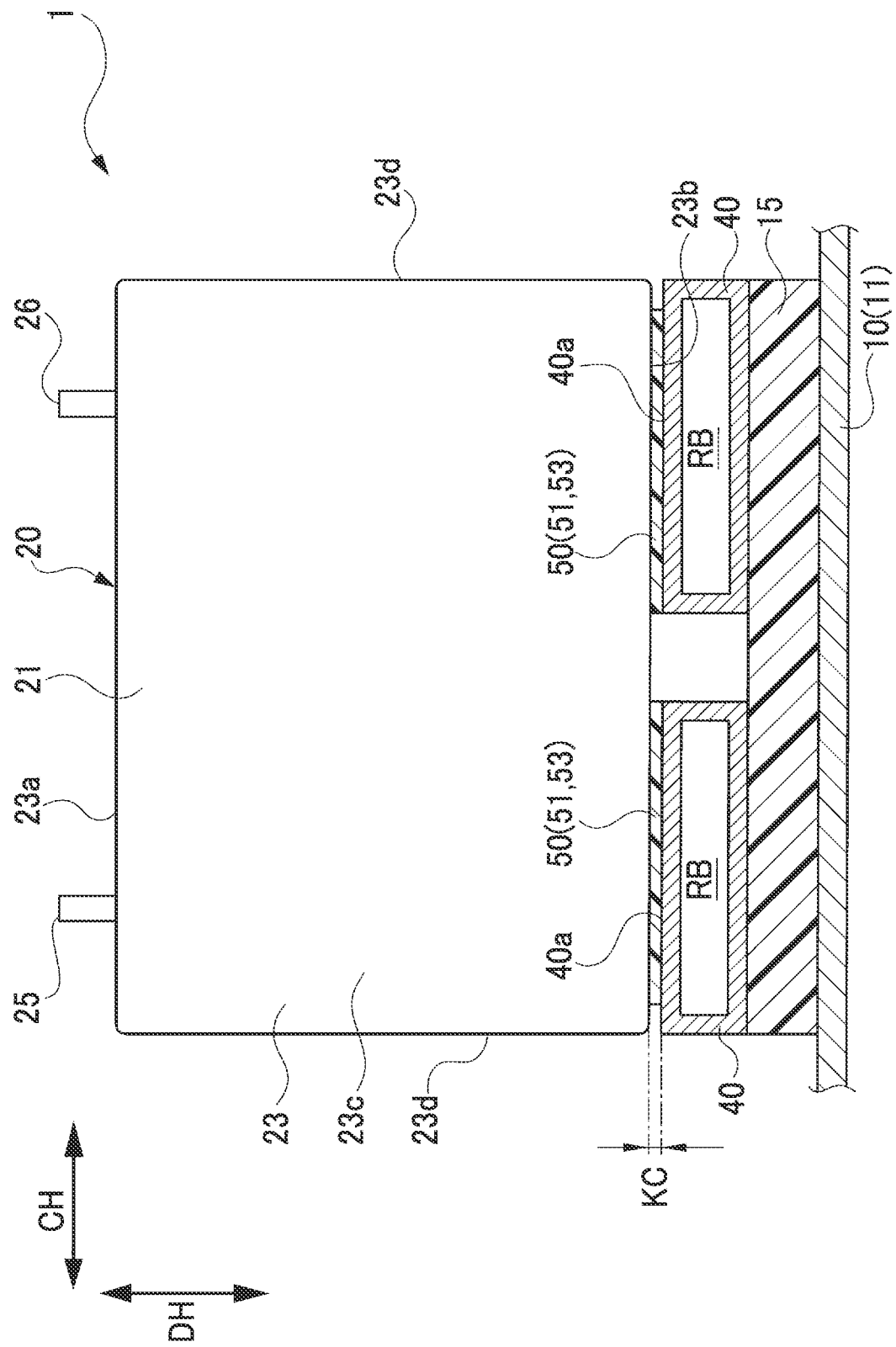
FIG. 2 is a cross-sectional view of the battery pack according to the embodiment of the disclosure along the lateral direction thereof and the longitudinal direction thereof (which is perpendicular to the alignment direction thereof)

The embodiment of the disclosure will be described hereinafter with reference to the drawings. FIGS. 1 and 2 are cross-sectional views of a battery pack 1 according to the present embodiment of the disclosure. Incidentally, the following description will be given on the assumption that an alignment direction BH, a lateral direction CH, and a longitudinal direction DH of the battery pack 1 are as shown in FIGS. 1 and 2. This battery pack 1 is an in-vehicle battery pack that is mounted in a vehicle such as an electric vehicle, a plug-in hybrid vehicle or the like. The battery pack 1 is equipped with a battery pack case 10, a battery module 20 that is accommodated in this battery pack case 10 and that includes a plurality of batteries 21, coolers 40 that are accommodated in the battery pack case 10 and that cool each of the batteries included in the battery module 20. Besides, a viscous layer 50 is interposed between a bottom surface (a heat dissipation surface) 23b of each of the batteries 21 included in the battery module 20 and each of the coolers 40.

The battery pack case 10 is made of aluminum and has a lower case 11 and an upper case (not shown) that is fixed to this lower case 11. In the battery module 20, a plurality of (six in FIG. 1) rectangular batteries 21 and a plurality of (five in FIG. 1) spacers 31 are alternately laminated on one another, and end plates 33 are arranged on both sides in this lamination direction (the alignment direction BH) respectively. These batteries and these spacers are bound while being pressed in the alignment direction BH by a plurality of binding members (not shown) that bridge the end plates 33 and 33.

Each of the batteries 21 is a sealed lithium-ion secondary battery in the shape of a rectangular parallelepiped. The plurality of the batteries 21 included in the battery module 20 are aligned with one another in a battery thickness direction EH thereof. The batteries 21 are connected in series to one another by a bus bar (not shown). In each of the batteries 21, an electrode body (not shown) that is obtained by stacking a band-shaped positive electrode plate and a band-shaped negative electrode plate on each other via a pair of band-shaped separators and winding them flatly is accommodated together with an electrolyte (not shown) inside a battery case 23 that is in the shape of a rectangular parallelepiped box and that is made of a metal (aluminum in the present embodiment of the disclosure). The battery case 23 has an upper surface 23a, a bottom surface 23b, a pair of first lateral surfaces 23c and 23c having a large area, and a pair of second lateral surfaces 23d and 23d having a small area. Incidentally, in the present embodiment of the disclosure, the bottom surface 23b of the battery case 23 is equivalent to each of the foregoing "heat dissipation surfaces".

A positive electrode terminal member 25 made of aluminum and a negative electrode terminal member 26 made of copper are fixedly provided on the upper surface 23a of the battery case 23, while being insulated from the battery case 23. The positive electrode terminal member 25 is connected and conducted to the positive electrode plate of the electrode body in the battery case 23, penetrates the upper surface 23a of the battery case 23, and extends to the outside of the battery. Besides, the negative electrode terminal member 26 is connected and conducted to the negative electrode plate of the electrode body in the battery case 23, penetrates the upper surface 23a of the battery case 23, and extends to the outside of the battery.

Each of the spacers 31 is a rectangular plate-shaped member made of insulating resin. Each of the spacers 31 is interposed between adjacent ones of the batteries 21 and 21, more specifically, between the first large-area lateral surfaces 23c and 23c of adjacent ones of the batteries 21 and 21. The end plates 33 are arranged on both sides in the alignment direction BH of the batteries 21 and spacers 31 that are laminated on one another, respectively. These end plates 33 are provided with a plurality of fixation portions (not shown) for fixing the battery module 20 to the lower case 11 of the battery pack case 10, and are fixed, together with the coolers 40 that will be described later, to the lower case 11 through the use of stud bolts (not shown) and nuts (not shown). Thus, the battery module 20 is fixed to the lower case 11 with each of the later-described coolers 40 sandwiched between the bottom surface 23*b* of each of the batteries 21 of the battery module 20 and the lower case 11.

The two coolers 40 and 40 are arranged below the battery module 20. Each of the coolers 40 is made of aluminum, assumes the shape of a square cylinder extending in the alignment direction BH, and is configured such that a cooling medium RB (a cooling medium for an in-vehicle air-conditioner in the present embodiment of the disclosure) that has been cooled to a predetermined temperature (10° C. in the present embodiment of the disclosure) flows through an interior thereof. Besides, a plate-shaped receptacle table 15 that is made of sponge with excellent thermal insulation properties and that extends in the alignment direction BH is arranged between the two coolers 40 and 40 and the lower case 11 of the battery pack case 10. Each of the coolers 40 is provided with a plurality of fixation portions (not shown) for fixing the cooler 40 itself to the battery pack case 10, and is fixed, together with the battery module 20, to the lower case 11 of the battery pack case 10 with the receptacle table 15 sandwiched therebetween through the use of the stud bolts (not shown) and the nuts (not shown) as described previously. In this state of assembly, clearances KC between the bottom surfaces 23*b* of the batteries 21 and upper surfaces 40*a* of the coolers 40 are equal to each other (KC=1.8 mm in the present embodiment of the disclosure).

The viscous layer 50 is a layer that is interposed between the bottom surface 23*b* of each of the batteries 21 and the upper surface 40*a* of each of the coolers 40 to transfer the heat of each of the batteries 21 to each of the coolers 40. The viscous layer 50 has a thickness of 1.8 mm. This viscous layer 50 has a heat dissipation grease 51 in which a negative coefficient filler 53 having a negative thermal expansion coefficient α (in the unit of 1/K where K represents kelvin) is dispersed. The viscous layer has a viscosity of 980 Pa·s. The ratio of the heat dissipation grease 51 to this viscous layer 50 is 99.2 wt %, whereas the ratio of the negative coefficient filler 53 to this viscous layer 50 is 0.8 wt %. In the present embodiment of the disclosure, the heat dissipation grease 51 is a silicon gap filler manufactured by Lord Japan Inc., and has a thermal conductivity of 3.2 W/m·K. This heat dissipation grease 51 contains 45 to 50 wt % of aluminum oxide ($Al_2O_3$), 17 to 21 wt % of zinc oxide (ZnO), and 30 wt % of a grease-like silicon resin. Besides, the negative coefficient filler 53 is a spherical glass filler whose thermal expansion coefficient α is equal to $-1.1 \times 10^{-6}$/K (DL-7400 manufactured by Nippon Electric Glass Co., Ltd.).

Next, a method of manufacturing the aforementioned battery pack 1 will be described. First of all, the batteries 21, the spacers 31, and the end plates 33 are prepared to form the battery module 20. That is, the plurality of the batteries 21 and the plurality of the spacers 31 are alternately stacked on one another, and the end plates 33 and 33 are further stacked thereon on both sides in the alignment direction BH thereof respectively. After that, while these laminated bodies are pressed in the alignment direction BH, the binding members (not shown) bridge the end plates 33 and 33 and are fixed to the end plates 33 and 33 respectively. Thus, the battery module 20 is formed.

Subsequently, the battery pack case 10, the receptacle table 15, and the coolers 40 and 40 are prepared, the battery module 20 and the coolers 40 and 40 are fixed to the lower case 11 of the battery pack case 10 via the receptacle table 15, and the viscous layers 50 are formed between the battery module 20 and the coolers 40 and 40 respectively. In concrete terms, the foregoing heat dissipation grease 51 and the negative coefficient filler 53 having the negative thermal expansion coefficient α(1/K) are mixed with each other to obtain a mixed grease. Then, this mixed grease is homogeneously applied to the upper surfaces 40*a* of the respective coolers 40 through the use of a dispenser, and the viscous layers 50 are formed on the upper surfaces 40*a* respectively. In this case, according to the present embodiment of the disclosure, the ratio of the negative coefficient filler 53 to the mixed grease is set equal to or smaller than 1.25 wt % (more specifically, 0.8 wt %), so the viscosity of the mixed grease is not too high (the viscosity is 980 Pa·s in the present embodiment of the disclosure). Therefore, a coating film can be formed with a uniform thickness while containing no void or the like.

After that, these coolers 40 and 40 are positioned and laid on the lower case 11 of the battery pack case 10 with the receptacle table 15 sandwiched therebetween. Furthermore, the battery module 20 is positioned from above these coolers 40 and 40 and laid thereon. After that, the fixation portions (not shown) of the respective coolers 40 and fixation portions (not shown) of the battery module 20 are fixed to the lower case 11 through the use of the stud bolts (not shown) and the nuts (not shown). Thus, the clearances KC between the bottom surfaces 23*b* of the respective batteries 21 and the upper surfaces 40*a* of the coolers 40 are equal to each other (KC=1.8 mm in the present embodiment of the disclosure), and the viscous layers 50 are formed with a thickness of 1.8 mm. After that, the battery pack 1 is completed by, for example, fixing an upper case portion (not shown).

Working Examples and Comparative Examples

Next, a result of a test conducted to verify the effect of the disclosure will be described. As shown in Table 1, as working examples 1 to 8 and comparative examples 1 and 2, 10 battery packs were manufactured by changing the blending amount (wt %) of the negative coefficient filler 53 in the viscous layers to 0 wt %, 0.3 wt %, 0.5 wt %, 0.8 wt % or 1.5 wt % and changing the thickness (mm) of the viscous layers to 1.8 mm or 4.8 mm. Besides, Table 1 also shows respective values of the viscosity (Pa·s) of the viscous layers as to the respective battery packs according to the working examples 1 to 8 and the comparative examples 1 and 2. Incidentally, the battery pack according to the working example 3 is identical to the battery pack 1 according to the foregoing embodiment of the disclosure.

TABLE 1

|  | Blending Amount of Filler (wt %) | Layer Thickness (mm) | Viscosity (Pa · s) | Variation in Battery Temperature (° C.) | | | Rating |
| --- | --- | --- | --- | --- | --- | --- | --- |
|  |  |  |  | Highest Temperature | Lowest Temperature | Difference in Temperature |  |
| Comparative Example 1 | 0 | 1.8 | 210 | 23.0 | 11.0 | 12.0 | C |
| Working Example 1 | 0.3 | 1.8 | 500 | 18.0 | 11.0 | 7.0 | B |
| Working Example 2 | 0.5 | 1.8 | 670 | 17.0 | 13.0 | 4.0 | A |
| Working Example 3 | 0.8 | 1.8 | 980 | 16.5 | 14.5 | 2.0 | A |
| Working Example 4 | 1.5 | 1.8 | 1710 | 24.0 | 16.0 | 8.0 | B |
| Comparative Example 2 | 0 | 4.8 | 210 | 25.5 | 12.5 | 13.0 | C |
| Working Example 5 | 0.3 | 4.8 | 500 | 22.0 | 14.0 | 8.0 | B |
| Working Example 6 | 0.5 | 4.8 | 670 | 20.5 | 15.5 | 5.0 | A |
| Working Example 7 | 0.8 | 4.8 | 980 | 19.0 | 16.0 | 3.0 | A |
| Working Example 8 | 1.5 | 4.8 | 1710 | 26.0 | 17.0 | 9.0 | B |

After that, using the respective battery packs according to the working examples 1 to 8 and the comparative examples 1 and 2 under a predetermined condition, the battery temperatures (° C.) of the respective batteries 21 included in each of the battery packs were measured. Incidentally, "the highest temperature" in Table 1 is the battery temperature of the battery 21 whose temperature is highest among the plurality of the batteries 21 included in the single battery pack. Besides, "the lowest temperature" in Table 1 is the battery temperature of the battery 21 whose temperature is lowest among the plurality of the batteries 21 included in the single battery pack.

Besides, "the difference in temperature" is the difference in temperature between the highest and lowest temperatures of the batteries 21 in the battery pack. In this experiment, the variation in battery temperature was evaluated based on the magnitude of this difference in temperature. In concrete terms, the case where the difference in battery temperature is lower than 6.0° C. was regarded as especially good (the rating: A), the case where the difference in battery temperature is equal to or higher than 6.0° C. and lower than 10.0° C. was regarded as good (the rating: B), and the case where the difference in battery temperature is equal to or higher than 10.0° C. was regarded as bad (the rating: C).

Figure 3:
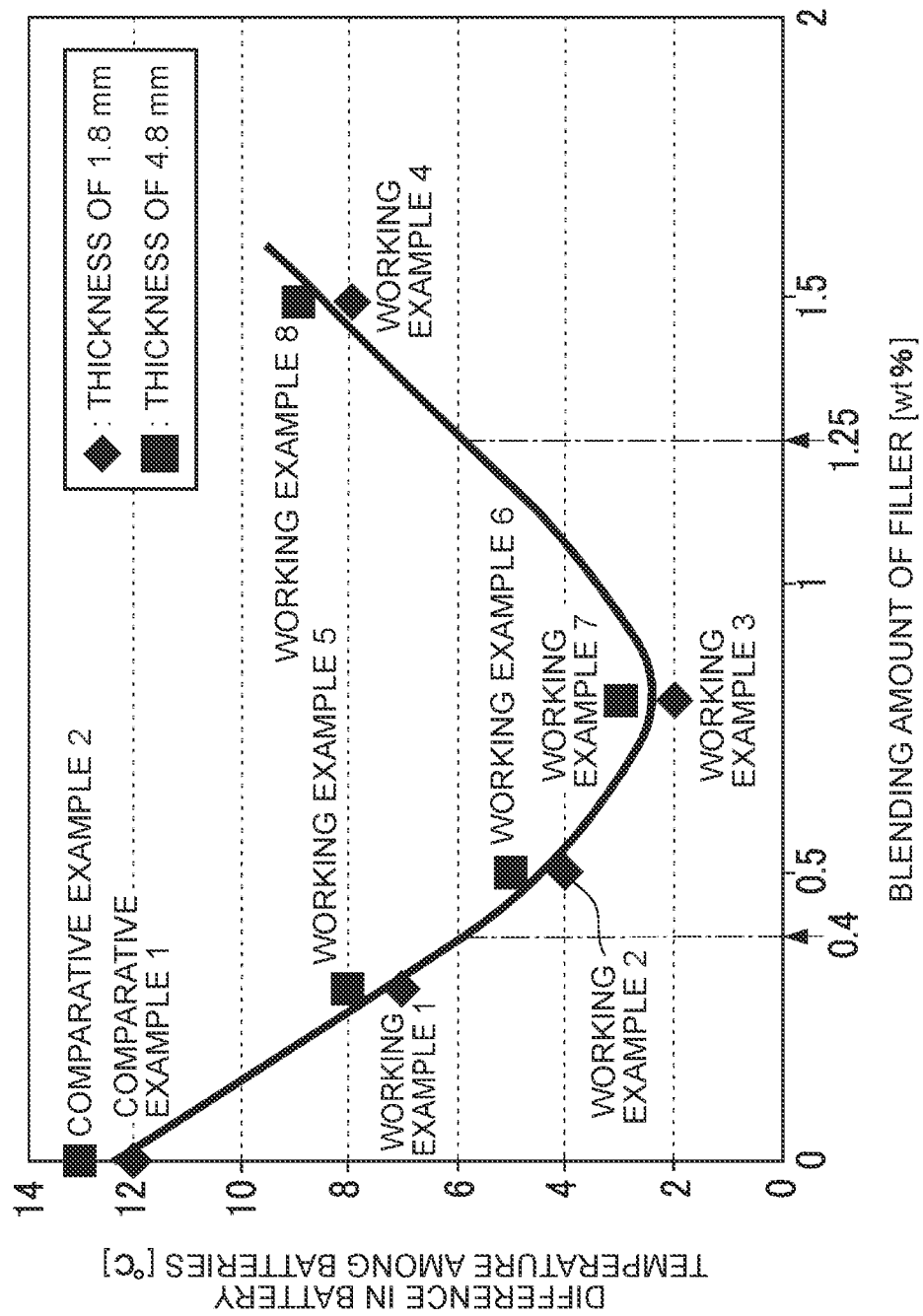
FIG. 3 is a graph showing a relationship between the blending amount of a negative coefficient filler in a viscous layer and the difference in battery temperature among batteries included in the battery pack.

The result is shown in Table 1 and FIG. 3. The comparative examples 1 and 2 were regarded as bad because the difference in battery temperature was high (equal to or higher than 10.0° C.). In contrast, the working examples 1 to 8 were regarded as good because the difference in battery temperature was low (lower than 10.0° C.). In particular, the working examples 2, 3, 6 and 7 were regarded as good because the difference in battery temperature was low (lower than 6.0° C.). The reason for this result is considered to be as follows.

That is, in each of the battery packs according to the comparative examples 1 and 2, the negative coefficient filler 53 is not blended into the viscous layers. The viscous layers expand when the temperature thereof becomes high. In the foregoing battery pack 1, the viscous layers do not increase in thickness. Therefore, when the viscous layers thermally expand, they spread in the direction (the alignment direction BH and the lateral direction CH) perpendicular to the thickness direction (the longitudinal direction DH) and decrease in density. Then, the amount of heat transfer Q(W) between the heat dissipation surfaces 23b of the batteries 21 and the coolers 40 falls, so the batteries 21 are unlikely to be cooled. Therefore, the batteries 21 that generate a small amount of heat are cooled well, whereas the batteries 21 that generate a large amount of heat are unlikely to be cooled, so the battery temperature widely varies among the batteries 21 included in each of the battery packs. Therefore, the comparative examples 1 and 2 were regarded as bad because the difference in battery temperature was high regardless of the thickness (1.8 mm or 4.8 mm) of the viscous layers.

On the other hand, the negative coefficient filler 53 is blended into the heat conduction viscous layers in each of the battery packs according to the working examples 1 to 8. As described above, the viscous layers according to each of the comparative examples 1 and 2, which do not contain the negative coefficient filler 53, thermally expand when the temperature thereof becomes high. In contrast, the viscous layers containing the negative coefficient filler 53 shrink when the temperature thereof becomes high, as far as the negative coefficient filler 53 is concerned. Therefore, the viscous layers containing the negative coefficient filler 53 are more effectively restrained from thermally expanding than the viscous layers according to each of the comparative examples 1 and 2 that do not contain the negative coefficient filler 53.

Therefore, the amount of heat transfer Q (W) between the heat dissipation surfaces 23b of the batteries 21 and the coolers 40 is more effectively restrained from falling even when the temperature thereof becomes high, in the viscous layers according to each of the working examples 1 to 8 that contain the negative coefficient filler 53 than in the viscous layers according to each of the comparative examples 1 and 2 that do not contain the negative coefficient filler 53. Therefore, even the batteries 21 that generate a large amount of heat are likely to be cooled. Accordingly, it is considered that the battery temperature could be more effectively restrained from varying among the batteries 21 included in the battery pack, regardless of the thickness of the viscous layers (1.8 mm or 4.8 mm), in the battery pack according to each of the working examples 1 to 8 that is equipped with the viscous layers containing the negative coefficient filler 53 than in the battery pack according to each of the comparative examples 1 and 2 that is equipped with the viscous layers containing no negative coefficient filler 53.

Besides, the blending amount of the negative coefficient filler 53 in the viscous layers is smaller than 0.4 wt % (more specifically, 0.3 wt %) in the battery pack according to each of the working examples 1 and 5, whereas the blending amount of the negative coefficient filler 53 in the viscous layers is equal to or larger than 0.4 wt % (more specifically, 0.5 wt % or 0.8 wt %) in the battery pack according to each of the working examples 2, 3, 6 and 7. By thus increasing the blending amount of the negative coefficient filler 53, the viscous layers could be more effectively restrained from thermally expanding. Therefore, it is considered that the battery temperature could especially be restrained from varying in the battery pack according to each of the working examples 2, 3, 6 and 7.

On the other hand, the blending amount of the negative coefficient filler 53 in the viscous layers is larger than 1.25 wt % (more specifically, 1.5 wt %) in the battery pack according to each of the working examples 4 and 8, whereas the blending amount of the negative coefficient filler 53 in the viscous layers is equal to or smaller than 1.25 wt % (more specifically, 0.5 wt % or 0.8 wt %) in the battery pack according to each of the working examples 2, 3, 6 and 7. Therefore, the viscosity of the viscous layers is higher in the battery pack according to each of the working examples 4 and 8 than in the battery pack according to each of the working examples 2, 3, 6 and 7. When the viscosity of the viscous layers is high as in the working examples 4 and 8, it is difficult to form the viscous layers with a uniform thickness while ensuring that no void or the like is contained therein, so the transfer of heat through the viscous layers is likely to be inhomogeneous. Therefore, the battery temperature is likely to widely vary among the batteries 21 included in the battery pack. In contrast, the viscosity of the viscous layers according to each of the working examples 2, 3, 6 and 7 is low. Therefore, the viscous layers can be formed with a uniform thickness while containing no void or the like, and hence can be formed such that heat is homogeneously transferred therethrough. Therefore, it is considered that the battery temperature could be prevented from widely varying among the batteries 21 included in the battery pack.

As described above, in the battery pack 1, each of the viscous layers 50 interposed between each of the bottom surfaces 23b of the batteries 21 and each of the coolers 40 contains the negative coefficient filler 53 having the negative thermal expansion coefficient $\alpha(1/K)$. A viscous layer that does not contain the negative coefficient filler 53 thermally expands as the temperature thereof becomes high. In contrast, each of the viscous layers 50 according to the present embodiment of the disclosure, which contains the negative coefficient filler 53, shrinks as the temperature thereof becomes high, as far as the negative coefficient filler 53 is concerned. Therefore, each of the viscous layers 50 according to the present embodiment of the disclosure is more effectively restrained from thermally expanding than the viscous layer that does not contain the negative coefficient filler 53.

Therefore, the amount of heat transfer Q (W) between each of the bottom surfaces 23b of the batteries 21 and each of the coolers 40 is more effectively restrained from falling even when the temperature of each of the viscous layers 50 that contains the negative coefficient filler 53 becomes high, than when the temperature of the viscous layer that does not contain the negative coefficient filler 53 becomes high. Therefore, even the batteries 21 that generate a large amount of heat are likely to be cooled. Accordingly, the battery temperature can be more effectively restrained from varying among the batteries 21 included in the battery pack 1, in the battery pack 1 according to the present embodiment of the disclosure that is equipped with the viscous layers 50 containing the negative coefficient filler 53 than in the battery pack that is equipped with the viscous layers containing no negative coefficient filler 53.

Furthermore, in the present embodiment of the disclosure, the greatly shrinking negative coefficient filler 53 having the thermal expansion coefficient $\alpha$ equal to or smaller than $-0.5 \times 10^{-6}/K$ is used, and the ratio of the negative coefficient filler to each of the viscous layers 50 is set large, that is, equal to or larger than 0.4 wt %. Therefore, the viscous layers 50 can be more effectively restrained from thermally expanding. Thus, the battery temperature can be more effectively restrained from varying among the batteries 21 included in the battery pack 1.

Besides, when each of the viscous layers 50 contains a large amount of the negative coefficient filler 53, more specifically, when the ratio of the negative coefficient filler 53 to each of the viscous layers 50 is larger than 1.25 wt %, the viscosity is too high. As a result, it is difficult to form the viscous layers 50 with a uniform thickness while ensuring that no void or the like is contained therein, so the transfer of heat through the viscous layers 50 is likely to be inhomogeneous. Therefore, the battery temperature is likely to widely vary among the batteries 21 included in the battery pack 1. In contrast, in the battery pack 1 according to the present embodiment of the disclosure, the ratio of the negative coefficient filler 53 to each of the viscous layers 50 is equal to or smaller than 1.25 wt %. Therefore, the viscous layers 50 can be formed with a uniform thickness while containing no void or the like, and hence can be formed such that heat is homogeneously transferred therethrough. Therefore, the battery temperature can be prevented from widely varying among the batteries 21 included in the battery pack 1.

Besides, in the present embodiment of the disclosure, the spherical glass filler having the negative thermal expansion coefficient $\alpha(1/K)$ is used as the negative coefficient filler 53. This glass filler is easily available and easy to handle, and hence is preferred as the negative coefficient filler 53.

The disclosure has been described hereinbefore with reference to the embodiment thereof. However, it goes without saying that the disclosure is not limited to the aforementioned embodiment thereof but is applicable after being appropriately changed within such a range as not to depart from the gist thereof.

What is claimed is:
1. A battery pack comprising:
   a plurality of batteries that include heat dissipation surfaces respectively;
   a cooler that cools each of the plurality of the batteries through each of the heat dissipation surfaces; and
   a viscous layer that is interposed between each of the heat dissipation surfaces and the cooler, the viscous layer containing a filler having a negative thermal expansion coefficient,
   wherein a ratio of a mass of the filler to a mass of all constituents in the viscous layer other than the filler is equal to or larger than 0.4 wt % and is equal to or smaller than 1.25 wt %.
2. The battery pack according to claim 1, wherein the batteries are aligned with one another.

3. The battery pack according to claim 1, wherein
the thermal expansion coefficient of the filler is equal to or smaller than $-0.5 \times 10^{-6}$ K$^{-1}$,
K represents kelvin.

4. The battery pack according to claim 1, wherein the filler is a spherical glass filler.

5. The battery pack according to claim 1, wherein the viscous layer has a thickness of 1.8 mm to 4.8 mm.

6. The battery pack according to claim 1, wherein the viscous layer comprises a heat dissipation grease in which the negative coefficient filler is dispersed.

7. The battery pack according to claim 6, wherein the heat dissipation grease contains 45 to 50 wt % of aluminum oxide ($Al_2O_3$), 17 to 21 wt % of zinc oxide (ZnO), and 30 wt % of a grease silicon resin.

8. The battery pack according to claim 1, wherein the cooler is configured so that a cooling medium flows through an interior thereof.

* * * * *